United States Patent [19]

Blanz

[11] 4,057,115
[45] Nov. 8, 1977

[54] FLEXIBLE SHAFT FOR A ROOF DRILL
[75] Inventor: John Blanz, Carlisle, Mass.
[73] Assignee: The United States of America as represented by the Secretary of the Interior, Washington, D.C.
[21] Appl. No.: 684,019
[22] Filed: May 7, 1976
[51] Int. Cl.² ............................................. B23Q 5/00
[52] U.S. Cl. ...................................... 173/160; 173/26; 173/147; 64/2 R
[58] Field of Search ................. 173/26, 140, 147, 160; 175/103; 64/2 R, 15 C

[56] References Cited
U.S. PATENT DOCUMENTS

| 434,748 | 8/1890 | Almond | 64/2 R |
| 2,644,669 | 7/1953 | Curtis et al. | 173/22 |
| 2,949,753 | 8/1960 | Menoni | 64/2 R |
| 3,000,197 | 9/1961 | Ruegg et al. | 64/2 R |
| 3,085,406 | 4/1963 | Hanebuth | 64/2 R |
| 3,347,061 | 10/1967 | Stuemky | 64/15 C |

FOREIGN PATENT DOCUMENTS 277,419  11/1951  Germany ............................... 64/2 R Primary Examiner—Robert A. Hafer
Attorney, Agent, or Firm—Gersten Sadowsky; Donald A. Gardiner

[57] ABSTRACT

A flexible shaft with an inner sleeve defining a hollow core for chip removal. A cylindrical rod is wound right handed into a helical configuration about the sleeve, the convolutions of the rod being in close adjacency with one another. A flat band is wound left handed into a helical configuration about the rod, adjacent convolutions of the band being in nesting relationship with one another.

9 Claims, 2 Drawing Figures

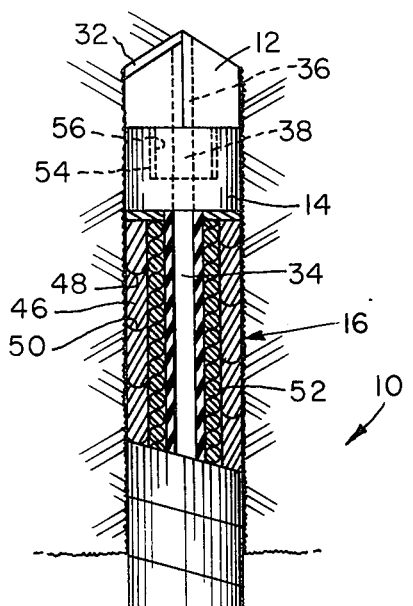
FIG. 1
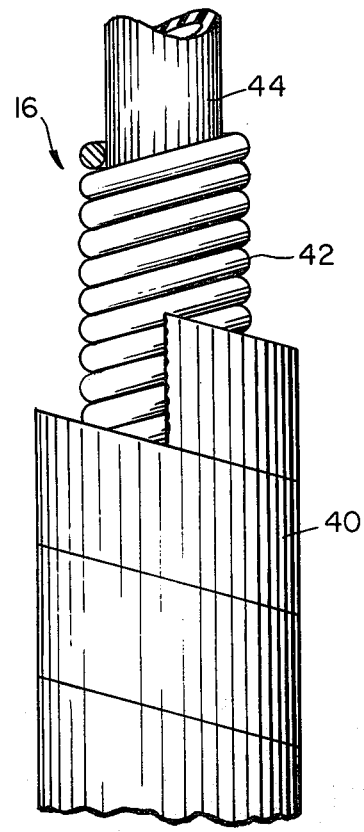
FIG. 2
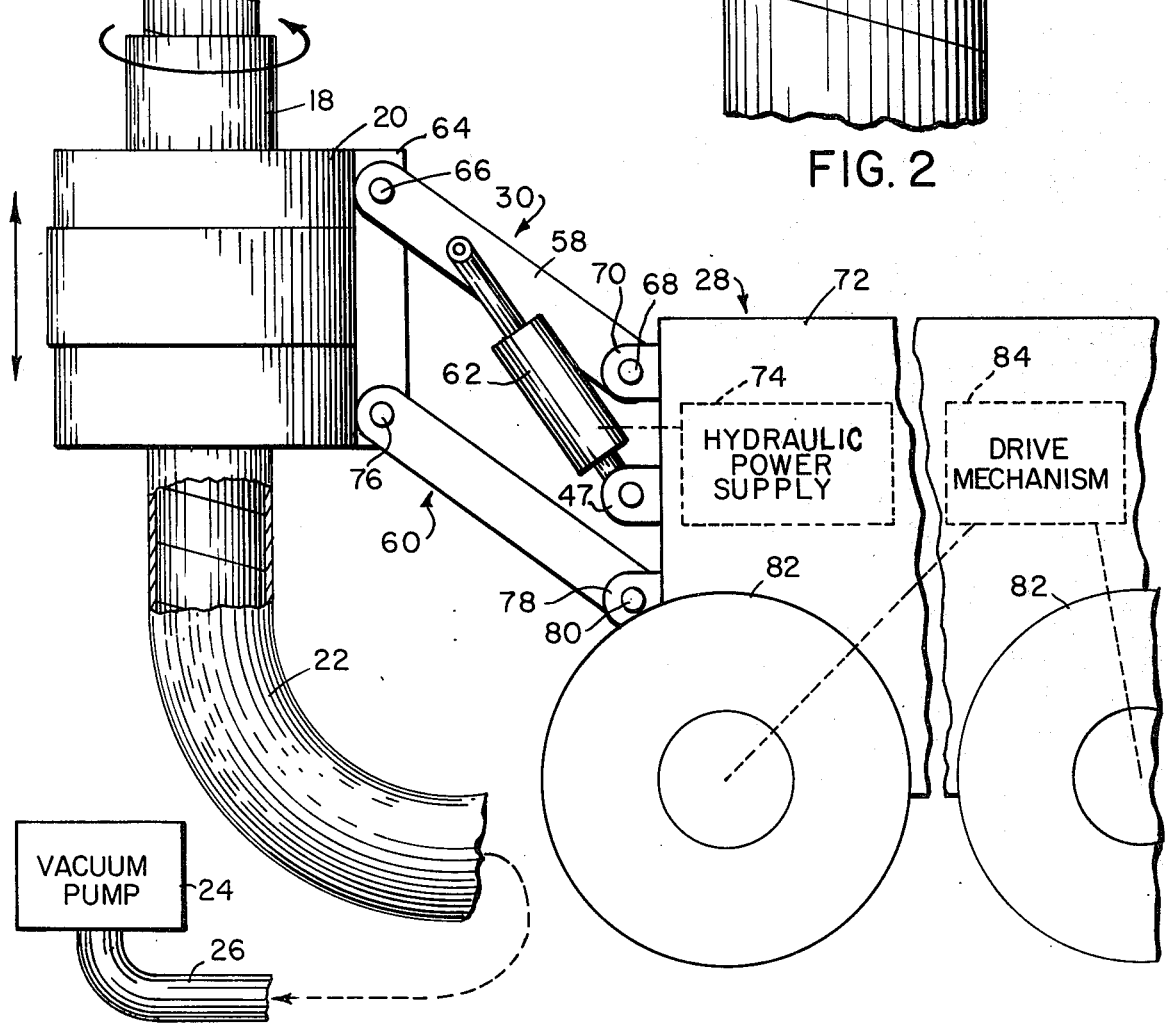

4,057,115

FLEXIBLE SHAFT FOR A ROOF DRILL

BACKGROUND OF THE INVENTION

1. Field of Invention

The present invention relates to shafts for drills and, more particularly, is directed towards a flexible shaft for a roof drill.

2. Description of the Prior Art

In the mining industry, falls of mine roofs account for a large percentage of the fatalities that occur in coal mines. Thus, roof control has been a major safety and production consideration. Roof fall fatalities have been greatly reduced in cases where the mine roof is supported with roof bolts that are inserted into holes which are drilled into the mine roof using a drll that is attached to a rigid shaft. As the holes become progressively deeper, the mine worker adds extension sections to the drill shaft. Such an operation requires the worker to be at the head of a roof drilling machine for starting the hole, for adding the extension sections and for inserting the bolts. A need has arisen for a flexible drill shaft for the drlling of roof bolt holes, the shaft being significantly greater than the mining height.

SUMMARY OF THE INVENTION

It is an object of the present invention to provide a flexible shaft for the drilling of roof bolt holes which are of significantly greater length than the mining height. The flexible shaft has an outer casing, an intermediate casing and an inner sleeve that are coaxial to one another and extend the length of the shaft. The outer casing is a flat band that is wound left handed into a helical configuration, adjacent convolutions of which are in nesting relationship. The intermediate casing is a circular rod that is wound right handed into a tight helical configuration. The inner surface of the outer casing is in close adjacency with the outer surface of the intermediate casing. The inner sleeve, the outer surface of which is in close adjacency with the inner surface of the intermediate casing, defines a hollow core for chip removal. A transitional member that is configured to receive a drill bit is mounted to one end of the flexible shaft. A drive mechanism is provided for applying thrust and torque. When torque is applied to the shaft, the outer casing tends to contract and the inner casing tends to expand for axial stability during the drilling operation. The contracting tendency of the outer casing and the expanding tendency of the inner casing provides a relatively rigid shaft when torque is applied to the shaft.

It is another object of the invention to provide a system for remote drilling of roof bolt holes.

Other objects of the present invention will in part be obvious and will in part appear hereinafter.

The invention accordingly comprises the apparatuses and systems, together with their parts, elements and interrelationships that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein:

FIG. 1 is a plan view, partly in section, of a drilling system having a flexible shaft embodying the invention; and FIG. 2 is a perspective view, partly cutaway, showing the flexible shaft of FIG. 1.

DETAILED DESCRIPTION OF THE PREFERRED EMBODIMENTS

Referring now to the drawings, particularly FIG. 1, there is shown a system 10 for remote drilling of holes in a mine for roof support, the holes being of significantly greater length than the mine height. The holes are drilled by means of a rock bit 12 that is attached to a transition member 14 on one end of a flexible shaft 16 which is significantly longer than the mine height. A chuck 18 of a driver 20 captively holds flexible shaft 16 intermediate its ends. The portion of flexible shaft 16 below driver 20 is slidably and rotatably received within a rigid annular guide 22 that is attached to the lower end of driver 20. The other end of guide 22 is connected to a suction device 24, for example a vacuum pump, via a flexible tube 26 for removal of chips during the drilling operation. Driver 20 is connected to a base 28, for example a wheeled vehicle, by means of a lifting mechanism 30. When driver 20 is energized, chuck, 18 rotates and cutting edges 32 of rock bit 12 chips away at the formation above the mine roof. The removed chips are sucked into a hollow core 34 of flexible shaft 16 through bores 36 and 38 in rock bit 12 and transition member 14, respectively. As rock bit 12 progresses, lifting mechanism 30 advances the rock bit further into the hole. As hereinafter described, flexible shaft 16 becomes rigid when torque is applied to it.

Referring now to FIG. 2, it will be seen that flexible shaft 16 is a cylindrical member having an outer casing 40, an intermediate casing 42 and an inner sleeve 44. Outer casing 40 is a flat band 46 composed of spring steel that is wound into a helical configuration. As best shown in FIG. 1, an upper edge 48 of band 46 has a concave profile in right cross section and lower edge 50 of band 46 has a convex profile in right cross section, concave edge 48 being in nesting relationship with convex edge 50 on adjacent convolutions of band 46. The inner and outer faces of outer casing 40 are flat and in spaced parallel relationship to each other. In the illustrated embodiment, the outside diameter of outer casing is 0.910 inch, the thickness of band 46 is .094 inch and the width of band 46 is 0.188 inch. Intermediate casing 42 is a circular rod 52 composed of spring steel that is tightly wound into a helical configuration opposite that of band 46. That is, in the illustrated embodiment, band 46 is wound left handed and rod 52 is wound right handed. The diameter of rod 52 is .125 inch. The inner surface of outer casing 40 is in contact with the inner surface of intermediate casing 42. Inner sleeve 44 is a tubular member composed of an elastomer, such as rubber. Outer casing 40, intermediate casing 42 and inner casing 44 are disposed coaxially about a longitudinal axis of shaft 16 and extend the length of shaft 16. The upper edge of outer casing 40 and the upper edge of intermediate casing 42 are welded to the bottom surface of transition member 14.

As shown in FIG. 1, transition member 40 is formed with an internally threaded socket 54 in which an externally threaded head 56 of rock bit 12 is turned. As previously indicated, bores 36 and 38 extend from the working end of rock bit 12 to the bottom surface of transition member 14 and connect with central core 34 of flexible shaft 16. Central core 34 and bores 36, 38 define a continuous passage that communicates with vacuum pump 24 via flexible tube 26 for removing chips during the drilling operation.

When driver 20 is energized during the drilling operation, torque is applied to shaft 16 which is captively held intermediate it ends in chuck 18. The application of torque to flexible shaft 16 tends to cause outer casing to contract inwardly and intermediate casing to expand outwardly. In consequence, shaft 16 becomes a substantially rigid structure.

As previously indicated, lifting mechanism 30 is provided for urging rock bit 12 into the bolt hole being drilled. Lifting mechanism 30 includes a pair of upper arms 58, a pair of lower arms 60, and a pair of actuators 62. It is to be noted that only one of each pair of arms and actuators is shown in the plan view of FIG. 1. One end of upper arm 58 is pivotally mounted to a bracket 64 by means of a pin 66, bracket 64 being mounted to driver 20. The other end of upper arm 58 is pivotally mounted via a pin 68 to a boss 70 that is mounted to a frame 72 of wheeled vehicle 28. Acutator 62, for example a hydraulic actuator, is pivotally mounted to arm 58 and a boss 47 that is attached to frame 72. A hydraulic power supply 74 is provided in wheeled vehicle 28 for hydraulic actuator 62. One end of lower arm 60 is pivotally mounted to bracket 64 via a pin 76. The other end of lower arm 60 is pivotally mounted to a boss 78 on frame 72 by means of a pin 80. it is to be understood that the other of arms 58 and 60 are connected to wheeled vehicle 28 and driver 20 in a similar manner. Also, the other hydraulic actuator 62 is operatively connected to wheeled vehicle 28 and the other arm 58 in the manner previously described. The upper arms, lower arms and hydraulic actuators are interconnected to work in unison. Vehicle 28 is provided with four wheels 82, two of which are shown, that are drivingly connected to a drive mechanism 84 which preferably is controlled remotely. Also, in the preferred embodiment, driver 20 is controlled from a remote source.

In operation, wheeled vehicle 28 is positioned in the mine at a location where the roof bolt hole is to be drilled. It is preferred that the height of wheeled vehicle 28 is 26 inches or less. Next, driver 20 is actuated and shaft 16 rotates. As the drilling of the roof bolt hole progresses, lifting mechanism urges rock bit 12 deeper into the formation drilled. The direction of rotation of chuck 18 is such that outer casing 40 tends to contract and intermediate casing 42 tends to expand dfor axial stability of shaft 16. That is, chuck rotates in a direction that is opposite to the direction in which band 46 is wound and that is the same direction in which rod 52 is wound. The free end of shaft 16 is contained within guide 22. The chips of rock formation are drawn from the roof bolt hole by vacuum pump 24. After lifting mechanism 30 reaches its upper limit, shaft 16 is released from chuck 18. It is to be noted that shaft 16 is frictionally held in the roof bolt hole and does not drop downwardly. Next, lifting mechanism is lowered to its lower limit. Next, chuck 18 captively engages a lower postion of shaft 16. Then driver 20 is actuated and the drilling process continues. When lifting mechanism reaches its upper limit, chuck 18 is released, lifting mechanism 30 is lowered, chuck 18 engages a lower section of shaft 16 and so on.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A flexible shaft for a roof drill comprising:
   a. a rock bit
   b. flat band wound in a helical configuration defining an outer casing, adjacent convolutions of said flat band in nesting relationship with one another at edges thereof to form outer and inner concentric flat cylindrical surfaces for said outer casing;
   c. a circular rod wound in ak helical configuration defining an intermediate casing that is disposed within said outer casing, adjacent convolutions of said circular rod touching one another and in close adjacency with said inner surface of said outer casing;
   d. a tubular member having a hollow core defining a longitudinal passage, said tubular member disposed within said intermediate casing and defining an inner sleeve having an outer surface in close adjacency with surfaces of said intermediate casing;
   e. said outer casing wound in a first direction and said intermediate casing wound in a second direction, said first direction opposite said second direction, said outer casing, said intermediate casing, and said inner sleeve coaxially disposed about a longitudinal axis of said shaft and extending the length of said shaft, and
   f. a transition member having one end of said flat band and circular rod attached thereto and said rock bit mounted thereon for a drilling operation therewith.

2. The flexible shaft as claimed in claim 1 wherein said flat band is wound left handed and said circular rod is wound right handed.

3. A flexible shaft for a roof drill comprising:
   a. a flat band wound in a helical configuration defining an outer casing, adjacent convolutions of said flat band in nesting relationship with one another wherein one edge of said flat band has a concave profile and an opposite edge of said flat band has a convex profile, and said concave edge is in said nesting relationship with said convex edge,
   b. a circular rod wound in a helical configuration defining an intermediate casing that is disposed within said outer casing, adjacent convolutions of said circular rod touching one another;
   c. a tubular member having a hollow core defining a longitudinal passage, said tubular member disposed within said intermediate casing and defining an inner sleeve, and
   d. said outer casing wound in a first direction and said intermediate casing wound in a second direction, said first direction opposite said second direction, said outer casing, said intermediate casing, and said inner sleeve coaxially disposed about a longitudinal axis of said shaft and extending the length of said shaft.

4. The flexible shaft as claimed in claim 3 wherein said flat band is composed of spring steel, said circular rod is composed of spring steel, and said tubular member is composed of an elastomer.

5. A system for drilling holes in a mine, said system comprising:
   a. a base, b. drive means mounted to said base, said ddrive means having energized and deenergized states, and wherein said drive means includes a chuck;

c. a flexible shaft including an outer casing, an intermediate casing, and an inner sleeve, said outer casing being a flat band that is wound in a first direction into a helical configuration, said intermediate casing being a circular rod that is wound in a second direction into a helical configuration, said second direction opposite said first direction, said sleeve being a tubular member having a hollow core defining a chamber for removing chips from said drilling, and said flexible shaft being engaged by said drive means by way of said chuck thereof captively holding said flexible shaft intermediate its ends, said chuck rotating in said second direction when said drive means is in said energized state;

d. a transition member mounted to one end of said flexible shaft; and e. a drill bit mounted to said transition member;

f. said drive means applying torque and thrust to said flexible shaft when in said energized state, said outer casing tending to contract and said intermediate casing tending to expand for axial stability of said flexible shaft when torque is applied thereto.

6. The system as claimed in claim 5 including a guide operatively connected to said drive means, a free end of said shaft slidably and rotatably received within said guide.

7. The system as claimed in claim 6 wherein said base is a wheeled vehicle.

8. The system as claimed in claim 12 including lifting means operatively connected to said base and said drive means for moving said chuck upwardly and downwardly for advancing said drill bit.

9. A system for drilling holes in a mine, said system comprising:

a. a base;

b. drive means mounted to said base, said drive means having energized and deenergized states;

c. a flexible shaft engaged by said drive means, said shaft including an outer casing, an intermediate casing, and an inner sleeve, said outer casing being flat band that is wound in a first direction into a helical configuration and wherein one edge of said flat band has a concave profile and an opposite edge of said flat band has a convex profile, said concave edge and said convex edge of adjacent convolutions being in nesting relationship, said intermediate casing being a circular rod that is wound in a second direction into a helical configuration, said second direction opposite said first direction, said sleeve being a tubular member having a hollow core defining a chamber for removing chips;

d. a transition member mounted to one end of said shaft; and e. a drill bit mounted to said transition member;

f. said drive means applying torque and thrust to said flexible shaft when in said energized states, said outer casing tending to contract and said intermediate casing tending to expand for axial stability of said shaft when torque is applied thereto.

* * * * *